Nov. 4, 1930.  E. A. JOHNSON  1,780,235
POTATO DIGGER BLADE
Filed Feb. 9, 1928
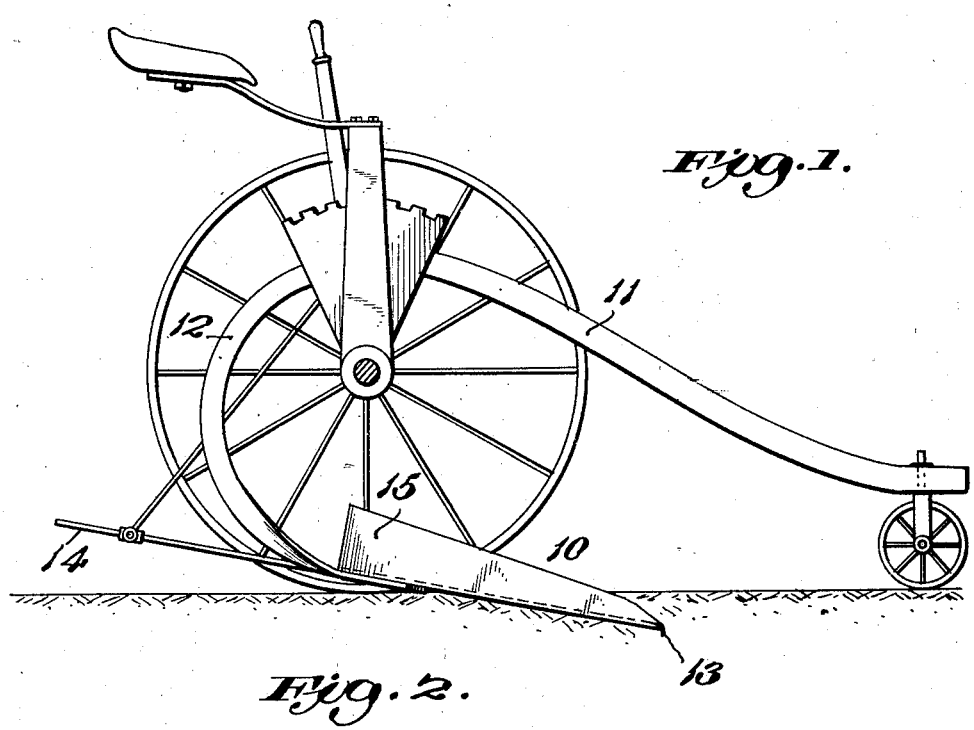
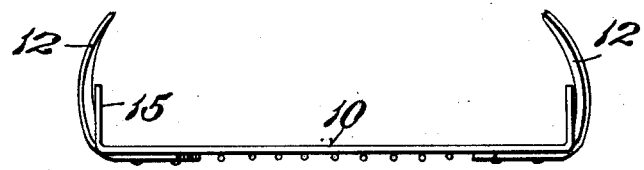
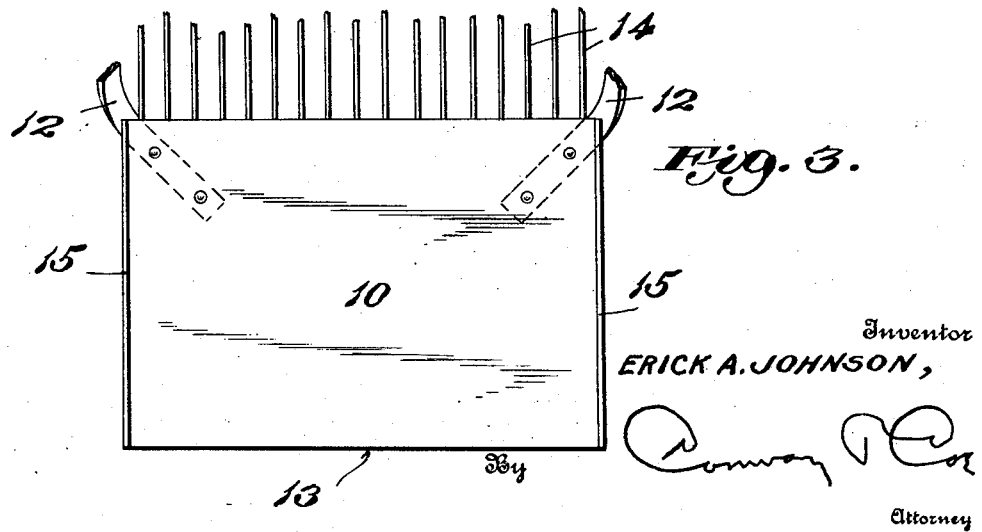
Inventor
ERICK A. JOHNSON,
By
Attorney Patented Nov. 4, 1930

1,780,235

UNITED STATES PATENT OFFICE

ERICK A. JOHNSON, OF PINE BLUFFS, WYOMING

POTATO-DIGGER BLADE

Application filed February 9, 1928. Serial No. 253,128.

This invention is an improved blade for use in machines for digging and screening potatoes and similar vegetables, and is designed to provide a blade of simple construction which will effectually dig and clean the vegetables and discharge them on the surface of the ground ready for gathering, leaving the ground practically smooth after digging.

A further object of the invention is to provide a blade so shaped as to mutilate a minimum of the vegetables being dug.

With the foregoing and other objects in view, the invention consists in the features hereinafter described and illustrated in the accompanying drawing, which shows a preferred embodiment thereof without defining its limits.

Fig. 1 shows a potato digger having the improved blade attached thereto.

Fig. 2 is a front elevation of the blade, and

Fig. 3 is a plan view of the same.

Referring more particularly to the drawings, the blade 10 is mounted in the usual relation on a digger 11 of any usual or suitable type, being supported, for example, by a bifurcated brace 12. The blade is thereby held in such position that its forward edge 13 lies sufficiently below the ground to pass beneath the potatoes to be dug. At the rear of the blade a screen 14 of any suitable type may be provided, for separating the potatoes from the soil. This screen preferably comprises a number of spaced screen bars rigidly connected to the rear edge of the blade, and parallel to the direction of movement of the blade.

The blade itself is of rectangular form as viewed in plan, so that the forward edge 13 extends rectilinearly perpendicular to the direction of motion of the blade. The blade is approximately twice as wide as it is long, being for instance thirteen inches in length between the forward and rear edges, and twenty-four inches in width. At its lateral edges it is provided with flanges 15 which, as seen in Fig. 1, taper substantially uniformly from the rear downwardly to the forward edge 13 of the blade. The forward edge 13 is preferably formed with the usual cutting edge, whereas flanges 15 are blunt at their upper edges.

In operation, the blade acts in the same manner as blades known in the art, but the forward edge 13 passes beneath the potatoes, not only at its central portion, but along its entire extent. In this respect the blade will be found superior to known blades of V-shaped cross section, which are arranged so that the point of the blade passes underneath the potatoes whereas the portions of the forward edge at either side of the point frequently engage and mutilate the potatoes being dug, especially where the path of the blade deviates even slightly from a true alignment with the row. With the present blade, considerable deviation from such alignment is permissible, and if the edge 13 is so set as to be below the level of the potatoes, it cannot in any event mutilate potatoes being dug, since the edges of flanges 15, being unsharpened, cannot injure them even though the edges come in contact with them.

In the above description, the invention has been described with particular reference to potatoes, but it will be understood that the device is equally applicable to other tubers or vegetables embedded in the ground.

Having described my invention, what I claim as new and desire to secure by Letters Patent of the United States is:

In a potato digger, a blade comprising a rectilinear member the width of which is substantially twice as great as its length, and having integral flanges at its lateral edges tapering from the rear of the blade to the forward edge thereof, the edges of said flanges being unsharpened, and screen bars rigidly connected to the rear edge of said blade.

ERICK A. JOHNSON.